No. 673,508. Patented May 7, 1901.
N. A. SMITHWICK.
GOVERNOR VALVE FOR AUTOMATIC PUMPS.
(Application filed Feb. 11, 1901.)

(No Model.) 2 Sheets—Sheet 1.

Witnesses.
A. E. Hopkins
C. B. Schoeneck

Inventor.
Nathaniel A. Smithwick
By Mark W. Dewey
his Attorney.

No. 673,508. Patented May 7, 1901.
N. A. SMITHWICK.
GOVERNOR VALVE FOR AUTOMATIC PUMPS.
(Application filed Feb. 11, 1901.)
(No Model.) 2 Sheets—Sheet 2.

Witnesses.
A. E. Hopkins
C. Schorneck

Inventor.
Nathaniel A. Smithwick
By Mark W. Dewey
his Attorney.

UNITED STATES PATENT OFFICE.

NATHANIEL A. SMITHWICK, OF SENECA FALLS, NEW YORK, ASSIGNOR TO THE GOULDS MANUFACTURING COMPANY, OF SAME PLACE.

GOVERNOR-VALVE FOR AUTOMATIC PUMPS.

SPECIFICATION forming part of Letters Patent No. 673,508, dated May 7, 1901.

Application filed February 11, 1901. Serial No. 46,802. (No model.)

*To all whom it may concern:*

Be it known that I, NATHANIEL A. SMITHWICK, of Seneca Falls, in the county of Seneca, in the State of New York, have invented new and useful Improvements in Governor-Valves for Automatic Pumps, of which the following, taken in connection with the accompanying drawings, is a full, clear, and exact description.

My invention relates to a shut-off valve or regulator for use in connection with an automatic pump operated by water under pressure from the city mains or any suitable source; and the object is to provide a more efficient device of this class and one possessing advantages over other similar devices.

Heretofore automatic pumps have been operated by allowing the pressure to remain on the power end, and the pump was started and stopped by drawing water at a faucet in the house and shutting off the same. It will be apparent that this causes a continuous and undue pressure on the plumbing system and on the pump end by having to balance the pressure on the larger power end, because the power end of these automatic pumps is made larger than the pump end.

By using my invention in connection with the pump when the pressure on the pump end reaches a predetermined point, which is adjustable, as hereinafter clearly pointed out, the shut-off valve automatically shuts off the pressure-water from the inlet to the power end. When shutting off this inlet-water, the device opens the inlet of the power end to the exhaust-opening, thus taking all the pressure off the power end, so that if there is a worn packing or a leaky gland there will be no pressure to make water leak out at this point.

My invention consists in certain combinations of parts for producing the above results, all hereinafter described, and more specifically set forth in the claims.

Figure 1:
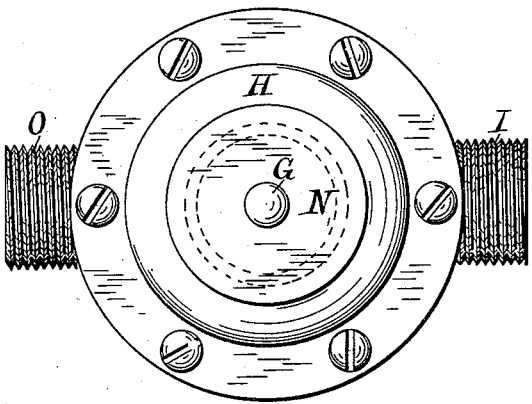
Figure 2:
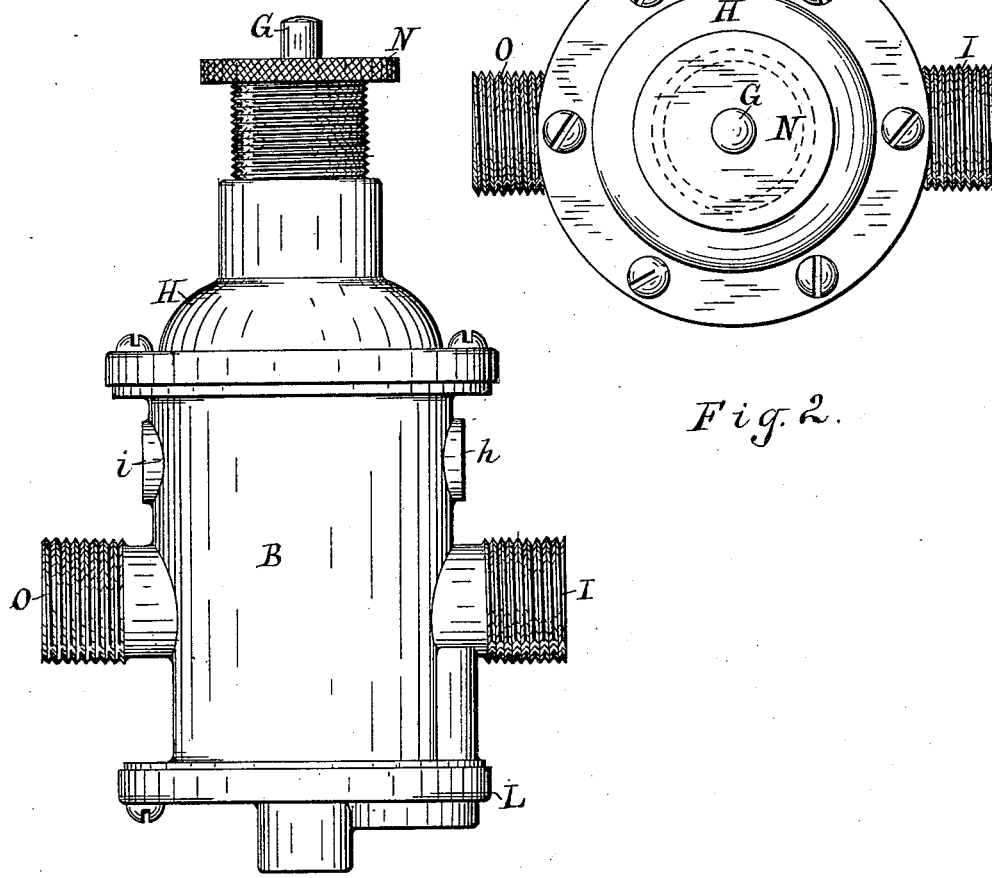
Figure 3:
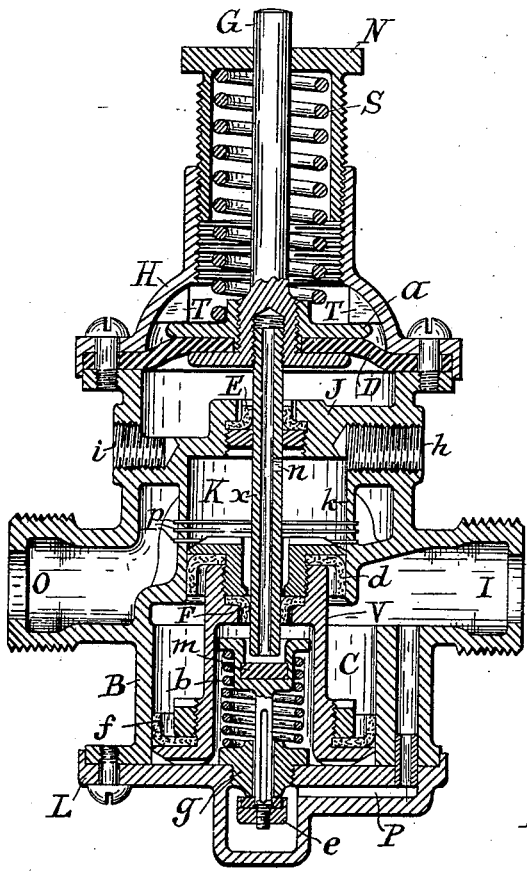
Figure 4:
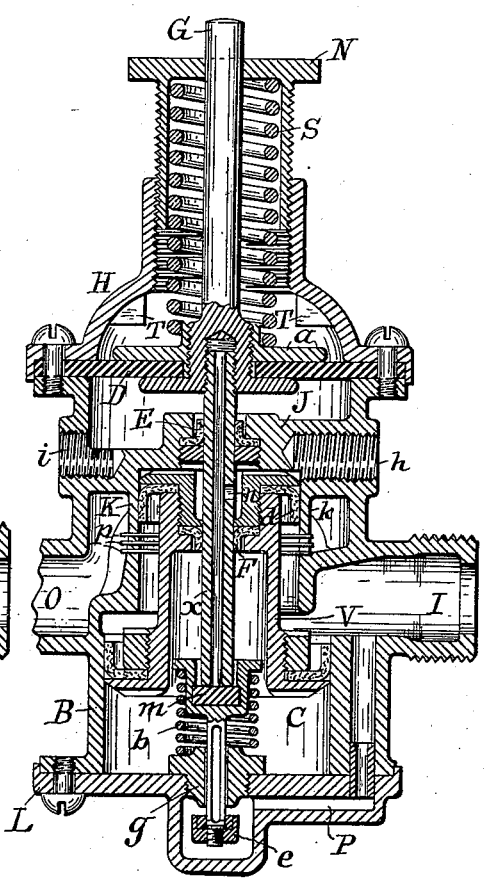

In the drawings hereto annexed and forming a part of this specification, Figure 1 is a side elevation of my improved shut-off valve. Fig. 2 is a top plan view of the same. Fig. 3 is a longitudinal vertical sectional view with several interior parts in elevation, and Fig. 4 is a similar sectional view showing the parts in their operative position or in position to permit the operation of the pump.

Similar letters of reference indicate corresponding parts in all the figures of the drawings.

Referring specifically to the drawings, B is the cylindrical case or casting, having the inlet-port I on one side and the outlet-port O, leading to the pump, on the opposite side.

$h$ is the exhaust connection, and $i$ the pressure connection.

H is the dome-shaped cap or upper head, and L is the lower cap or head, both of which heads are secured to the cylindrical case by bolts or screws, as shown, passing through meeting flanges on said parts.

V is the main valve, located in the lower part of the case, is cylindrical and concentric with the case, and is movable vertically therein.

$e$ is the auxiliary valve within a small chamber in the lower head L.

The exhaust-valve $x$ consists of a vertically-movable small tube, which passes through a central aperture in the auxiliary valve and is open at its lower end when not engaging a yielding seat $m$ below it and has an aperture or port $n$ in one side.

D is the flexible diaphragm, secured at its outer edges between the flanges of the case B and the head H.

N is the hollow adjusting-nut, which is externally threaded to engage the thread on the inner side of the head H, and S is a coiled spring within the hollow adjusting-nut and bearing upon its inner upper end and upon the disk $a$ upon the upper side of the said diaphragm. The spring S incloses a vertical central stem G, which extends upward from the diaphragm and through the adjustable nut N. The exhaust-valve tube $x$ is secured at its upper end in the lower end of the stem G and both are reciprocated vertically together.

J is the horizontal partition in the case B below the diaphragm, the pressure connection opening into the chamber above the partition and the exhaust connection opening below it into a chamber K, having walls $k$ concentric with the case containing narrow horizontal apertures forming what is termed the "port" $p$.

T represents angular projections within and integral with the upper head H to act as a stop for the diaphragm D when it is forced upward.

P is a port leading from the lower side of the inlet-port I downward vertically and then horizontally through the lower head L to a small chamber provided with the auxiliary valve $e$.

$g$ is the seat for said valve, secured stationary in the head L above the valve, and $b$ is a small coiled spring between the upper side of the seat $g$ and the lower side of the seat $m$.

The apertures forming the port $p$ are preferably slits made by a saw in the walls $k$.

E and F are packing-leathers around and in contact with the valve-tube $x$, and $d$ and $f$ are cup-shaped packing-leathers on valve V. Packing-leather $d$ being on the upper part of the valve forms the valve proper, and leather $f$ on the lower part forms a piston.

In the operation of the device the water enters from the main at I and fills the space around the main valve V between the packing-leathers $d$ and $f$. The water also passes through the port P to the chamber around the auxiliary valve $e$. The fluid pumped by the automatic pump (not shown) enters the chamber under the diaphragm D through a pipe connected at $i$. When the pressure of fluid below the diaphragm is reduced, the adjusting-spring S forces the diaphragm D down, (see Fig. 4,) carrying with it the connected exhaust-valve $x$, which works through the packing-leathers E and F to its seat $m$ and by further movement downward forces the auxiliary valve $e$ from its seat $g$ against the tension of the spring $b$. The water from the port P flows upward through the grooves in the valve-stem $e$ into the chamber C. This balances the pressure on the two sides of the cup-leather $f$ and allows the pressure on the unbalanced area of the main valve V to carry the cup-leather $d$ over and above the port $p$, allowing the water to flow out at O to the automatic pump and cause it to operate and create a pressure in the chamber under the diaphragm D. As this pressure increases it raises the diaphragm against the tension of the spring S until it reaches the stops T. As the diaphragm raises it allows the spring $b$ to seat the auxiliary valve $e$, shutting off the pressure-water. A further movement of the diaphragm, due to a pressure determined by tension on spring S, lifts the exhaust-valve $x$ away from its seat $m$ and allows the water under the main valve V to escape through the port $n$ in the side of the exhaust valve or tube $x$. As both ends of the main valve V are now open to the exhaust, the pressure on the cup-leather $f$, which is of larger area than the cup-leather $d$, forces the main valve down and shuts off the water flowing to the pump through O by drawing the cup-leather $d$ over the port $p$. This movement also opens the outlet-port O, and consequently the power end of the automatic pump to the exhaust connection $h$ through the port $p$. In this way all pressure is taken off from the power end of the pump, and any creeping of the valves or leaking at a worn pump-packing is entirely obviated. This last feature is of particular importance and one not contained in any other shut-off valve.

It will be noticed that the main valve is moved in opposite directions by the pressure of the water alone and not by a spring.

I do not desire to be limited to the precise form of shut-off valve shown in the drawings, inasmuch as the same may be modified without departing from my invention.

Having described my invention, what I claim as new, and desire to secure by Letters Patent, is—

1. In a shut-off device for an automatic pump, the combination with the case having an inlet and an outlet port, the pressure connection, the exhaust connection, the horizontal diaphragm having a stem extending upward, the adjusting-nut in the upper head of the case, and the spring between the nut and the diaphragm of the vertically-reciprocating main valve, the auxiliary valve in a chamber communicating with the inlet, the exhaust-valve, and the port in the wall inclosing the main valve communicating with the said inlet and outlet ports when the main valve is in its raised position, substantially as and for the purpose described.

2. In a shut-off device for an automatic pump, the combination with the case having inlet and outlet ports, the pressure-inlet and the exhaust-outlet, the horizontal diaphragm above said inlets and outlets, the adjustable nut in the upper head of the case and the spring between the said nut and the diaphragm, of the vertically-reciprocating main valve having packing-leathers at opposite ends differing in diameter and engaging the inner walls of the case, a vertical tube closed at its upper end and secured to the diaphragm and movable vertically with the same, said tube having an outlet-port in one side, a yielding seat for the lower end of the tube to close the same when the latter is depressed, an auxiliary valve below and carried by the yielding seat, a seat for the latter valve secured in the lower head of the case, a chamber for the auxiliary valve provided with a conduit leading to the inlet-port, a horizontal partition in the case below the diaphragm, the pressure-inlet opening above the partition and the exhaust-outlet below it, and the port in the wall engaging the upper packing-leather of the main valve, as set forth.

3. In a shut-off device for an automatic pump, the combination with the cylindrical case having the inlet-port for water communicating with a chamber encircling the main valve between its leathers at opposite ends, the vertically-reciprocating main valve, the port $p$, in the walls of said chamber connecting the inlet with the outlet when the valve is raised, the outlet for connection with the pump, the inlet $i$, to receive water from the pump, a horizontal partition in the case to form a chamber above the same communicating with the inlet $i$, the yielding diaphragm forming the upper wall of the said chamber, means to vary the pressure on the upper side of the diaphragm, the auxiliary valve in the lower part of the case inclosed in a chamber communicating with the main inlet, the exhaust-valve and its outlet and the exhaust-outlet $h$, substantially as and for the purpose described.

4. In a shut-off device for an automatic pump, the combination with the cylindrical case having inlet and outlet ports on opposite sides, the pressure-inlet and the exhaust-outlet above the other inlet and outlet, the horizontal yielding diaphragm above said inlets and outlets, the vertically-adjustable nut in the upper head of the case, the coiled spring in the case between the said nut and the diaphragm, of the vertically-reciprocating main valve having packing-leathers at opposite ends differing in diameter, the lower packing-leather being larger than the upper one, and engaging the inner walls of the case, a port formed by horizontal slits in the inner concentric walls of the case in engagement with the upper leather of the main valve, a vertical tube closed at its upper end and secured to the diaphragm and movable vertically with the same, said tube having an outlet-port in one side, a yielding seat for the lower end of the tube to close the same when the latter is depressed, an auxiliary valve below and carried by a stem extending downward from the yielding seat, a stationary seat for the latter valve secured in the lower head of the case, a chamber containing the auxiliary valve, a conduit leading from the chamber to the inlet-port, a horizontal partition in the upper part of the case below the diaphragm separating the said pressure-inlet from the exhaust-outlet, the former opening into the chamber above the partition and below the said diaphragm, and the central apertures in the main valve and in the partition for the said tube to move in, substantially as and for the purpose described.

In testimony whereof I have hereunto signed my name.

NATHANIEL A. SMITHWICK. [L. S.]

Witnesses:
 SEABURY S. GOULD,
 JOSEPH J. SWABY.